United States Patent [19]
Chase et al.

[11] Patent Number: 5,350,614
[45] Date of Patent: Sep. 27, 1994

[54] ALL COMPOSITE ARTICLE OF MANUFACTURE INCLUDING FIRST AND SECOND COMPOSITE MEMBERS JOINED BY A COMPOSITE HINGE

[75] Inventors: Vance A. Chase, Oxford; Thomas S. Scarpati, Madison, both of Conn.

[73] Assignee: United Technologies Corporation, Hartford, Conn.

[21] Appl. No.: 70,032

[22] Filed: Mar. 3, 1993

Related U.S. Application Data

[63] Continuation of Ser. No. 735,501, Jul. 25, 1991.

[51] Int. Cl.⁵ .................... B32B 3/10; B32B 3/14; B32B 7/00
[52] U.S. Cl. .................... 428/53; 428/54; 428/57; 428/58; 428/60; 428/77; 428/78; 428/102; 428/188; 428/190; 428/246; 428/252; 428/284; 428/902

[58] Field of Search .............. 428/53, 54, 57, 58, 428/60, 77, 78, 102, 188, 190, 246, 252, 284, 902

[56] References Cited

U.S. PATENT DOCUMENTS

| | | | |
|---|---|---|---|
| 3,619,314 | 11/1971 | Ecureux | 428/60 |
| 4,257,837 | 3/1981 | Lucas | 156/157 |
| 4,279,676 | 7/1981 | Morrison et al. | 428/68 |
| 4,398,982 | 8/1983 | Witerski et al. | 156/157 |
| 4,551,375 | 11/1985 | Sato et al. | 428/57 |
| 4,564,542 | 1/1986 | Worcester | 428/58 |
| 4,564,543 | 1/1986 | Ritter | 428/60 |
| 4,569,870 | 2/1986 | Shinmi | 428/57 |
| 4,885,820 | 12/1989 | Erceg | 156/304.3 |

Primary Examiner—James D. Withers
Attorney, Agent, or Firm—Vernon F. Hauschild

[57] ABSTRACT

An all-composite article comprising two composite parts pivotally joined by a composite hinge which is fabricated integrally therewith. The method of making such an all-composite article.

14 Claims, 3 Drawing Sheets

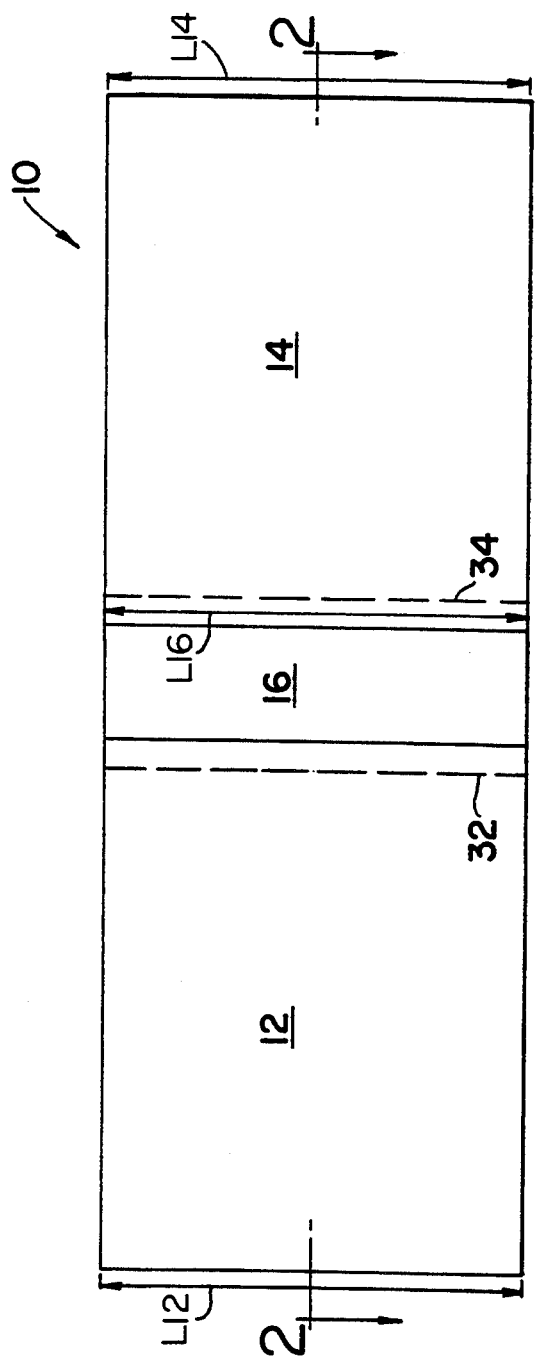
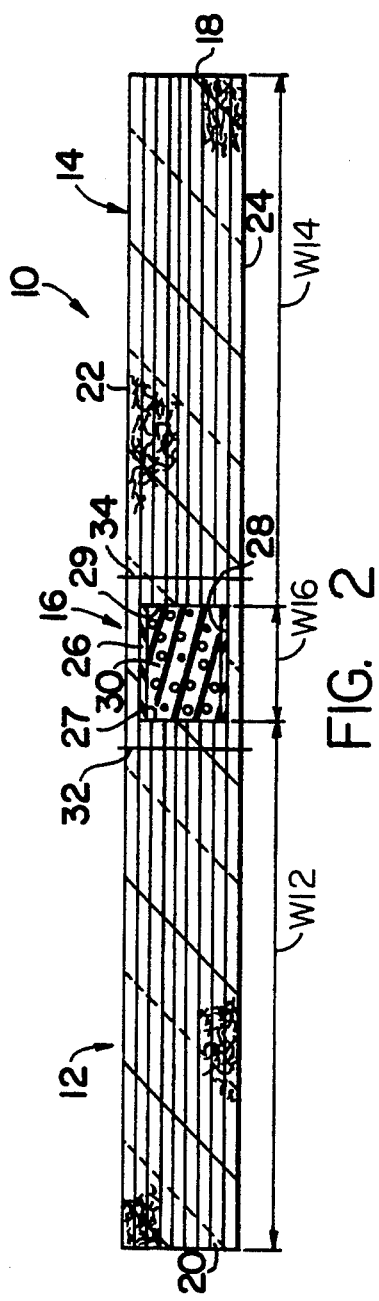

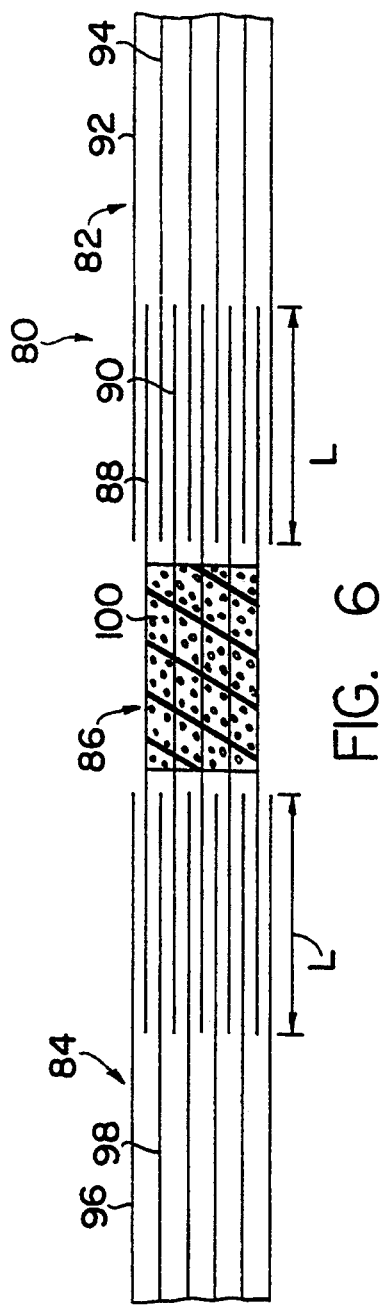
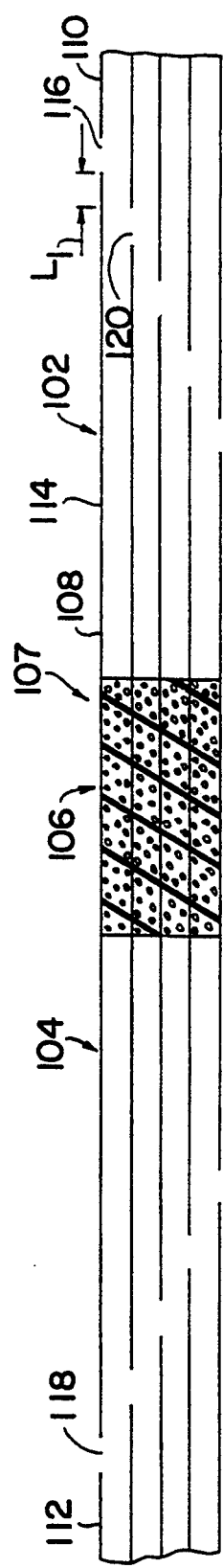

5,350,614

ALL COMPOSITE ARTICLE OF MANUFACTURE INCLUDING FIRST AND SECOND COMPOSITE MEMBERS JOINED BY A COMPOSITE HINGE

DESCRIPTION

This is a continuation of U.S. Ser. No. 07/735,501 filed Jul. 25, 1991, which is presently under a secrecy order.

TECHNICAL FIELD

This invention relates to an all-composite product including two or more composite members joined by a composite hinge, and in which the composite parts and hinge or hinges are fabricated simultaneously.

BACKGROUND OF THE INVENTION

In the past, when composite parts had to be joined through a hinge connection so as to be pivotable about that hinge with respect to one another, it was common practice to use a conventional metal hinge of the piano hinge variety. The disadvantage of using such a metallic hinge rather than a composite hinge is increased weight, reduced strength, high manufacturing cost, possible interference with electrical system requirements, increased radar signature, the requirement that the metal hinge be made separately from the composite parts, and the requirement for drilling, fastening or bonding the metallic hinge to the composite parts which it joins. This drilling and fastener type connection between the metallic hinge and the composite part is unsatisfactory because of the low bearing strength of composites.

While injection molded thermoplastic hinges are presently available of the same design as the prior art metal piano-type hinges, these thermoplastic hinges are not compatible with the epoxy resin composites used throughout many industries today, are low in strength, have limited service capability, and are not capable of joining the two composite structures during the manufacturing process. These thermoplastic hinges must also be fabricated separately, and separately fastened to the composite members being joined in the same fashion that the metal hinges require such separate fastening.

DISCLOSURE OF THE INVENTION

It is therefore an object of this invention to teach a composite hinge that offers advantages over the prior art hinges of lower weight, higher strength, lower manufacturing cost, reduced radar signature, and compatibility with electrical system requirements.

It is a further object of this invention to teach such a composite hinge which joins two composite parts in a single fabrication process which fabricates the two composite parts and the composite hinge simultaneously.

It is a further object of this invention to teach an all-composite article of manufacture, and the method of manufacturing same, which comprises at least two composite members of any selected shape capable of being pivotally connected and a composite hinge joining the two composite members, such that the two composite members and the hinge are fabricated in a single process.

It is still a further object of this invention to teach such an all-composite article of manufacture in which at least one ply of fabric made of high tensile strength fibers extends between the two composite parts to be hinge joined, and wherein means are provided to prevent wet-out and adhesion by the composite members resin matrix to these plies at the hinge area during the curing process.

It is still a further object of this invention to teach such an all-composite article comprising two composite members joined by a composite hinge and including a plurality of plies made of high tensile strength fiber extending continuously for substantially the full width and length of each composite part being hinge joined and forming the composite hinge. An appropriate flexible material, such as silicone rubber, is used to coat and impregnate the composite plies forming the composite hinge so as to both add flexibility to the hinge and to prevent the resin of the composite members resin matrix from adhering to the plies at the hinge area during the curing process.

It is a further object of this invention to teach the method of forming a hinged composite product by laying up plies which have suitable treatment at the hinge area to provide flexibility and to prevent resin adhering to the fibers of the plies in the hinge area. While such plies may be of one-piece construction, if the size of the product being so fabricated is sufficiently large that it is necessary to make the plies of more than one piece, then the number of plies forming the hinge and the distance that these hinge plies extend into the composite members is determined by the strength requirements of the hinged design.

It is still a further object of this invention to teach the method of manufacturing such an all-composite part including at least two composite members joined by an all-composite hinge. The product is fabricated by laying up plies of fiber reinforcement made of high tensile strength materials such as glass, aramid and carbon, which plies are either laid-up dry or resin impregnated, and which plies define the dimensions of the two composite parts to be hinge joined. At least some of the plies extend continuously across the hinge area and into both composite members to be joined by the composite hinge. A protective material is applied to the plies at the hinge area thereof to add flexibility thereto and to prevent the adhesion of resin thereto during the curing process. Finally either curing the protective material by itself or concurring the protective material with the composite members and the composite hinge.

It is still a further object of this invention to teach such an all-composite article in which the protecting material is applied to the hinge portion of the composite article either by brush, squeegee, spray, tape or other suitable method such that it fully impregnates the hinge portion of the ply or plies when cured.

It is still a further object of this invention to teach such an all-composite part in which the protecting material for the hinge portion is chosen from the group of materials consisting of RTV silicone rubber, unvulcanized rubber, and thermoplastic elastomer.

Other objects, features and advantages of the invention will become apparent in light of the following description thereof.

BRIEF DESCRIPTION OF THE DRAWINGS

FIG. 1 is a top view of our all-composite article including two rigid composite members joined through our flexible hinge.

FIG. 2 is a section taken along line 2—2 of FIG. 1.

FIGS. 6 and 7 correspond to FIGS. 2, 3 and 4, but illustrate constructions in which one or more of the plies are of multi-piece construction.

BEST MODE FOR CARRYING OUT THE INVENTION

Figure 3:
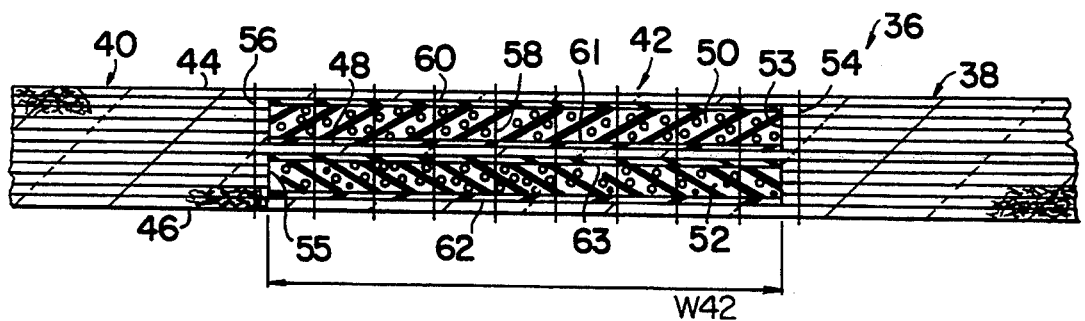
FIG. 3 is partial cross sectional showing corresponding to FIG. 2 but showing a more flexible composite hinge pivotally joining rigid composite members.

Referring to FIG. 1 we see all-composite article or product 10 which comprises rigid composite members 12 and 14 pivotally joined through an all-composite hinge 16. For purposes of simplification of explanation, composite article 10 is shown as two rectangular panel members 12 and 14 joined through a composite hinge, however, article 10 could comprise two composite members of any shape capable of pivotal action about a hinge with respect to each other. Further, a series of such composite parts could be joined by a plurality of such composite hinges. Our hinge may be used in composite articles quite as simple as a hinged storage compartment door in a helicopter pilot compartment, and also on complex articles such as aerodynamic control surfaces on missiles and aircraft.

As shown in FIG. 2, article 10 includes a plurality of plies of fiber material made of high tensile strength fibers such as fiber glass, aramid and carbon, such as 18 and 20, which are laid-up successively to form composite members 12 and 14. Plies 18 and 20 may be preimpregnated with a resin or other suitable material to form a matrix for the plies following curing, or may be laid-up dry with the matrix material being applied thereto by resin injection molding (RTM) or otherwise following lay up and prior to the curing process. Still viewing FIG. 2 we see that outer plies 22 and 24 preferably extend for the full width W14 of composite member 14, across the full width W16 of the composite hinge 16 and then continue for the substantially the full width W12 of composite member 12. Plies 22 and 24, as well as plies such as 18 and 20, preferably also extend for the full length L12 and L14 of members 12 and 14. In this fashion, the plies define the final shape of members 12 and 14 when cured.

As used and claimed herein, a ply of high tensile strength fibers is a single layer of high tensile strength fibers which may all be extending in a single direction, or one or more groups of such fibers extending in a variety of different directions such as 0°, +45°, −45°, or other angular direction, or the fibers may be woven, or in a combination of any of the directional or woven conditions described above, and may be of one piece construction or a plurality of joined pieces.

While in the FIG. 1 and 2 construction, the central plies such as 18 and 20 can be laid-up either prepreg or dry, it is desirable that the top and bottom plies 22 and 24 be laid-up dry with the protective material 26 and 28 applied to the hinge portion of plies 22 and 24 before lay up.

Prior to ply lay up, a protective, flexible material, such as silicone rubber or thermoplastic elastomer, shown at 26, and 28, is used to impregnate the outer plies 22 and 24, respectively, at the hinge area, to prevent wet-out and adhesion of the resin matrix of members 12 and 14 to the hinge portion of plies 22 and 24 during the curing process. While the protective material shown at 26 and 28 in FIG. 2 is illustrated as separate from the outer plies 22 and 24, this is purely for purposes of illustration and it will be understood that following curing, the protective material shown at 26 and 28 is preferably fully impregnated into plies 22, 24. This is also true of the showing of the protective layers shown in subsequent figures and it must be borne in mind that in the final product following curing, the protective material is fully impregnated into the appropriate plies. It will be noted that the fiber impregnating protective material 26 and 28 extends for the full desired width W16 and length L16 of the composite joint 16. We have found that when the inner plies such as 18 and 20 are laid-up prepreg, that is, with the resin matrix material previously impregnated into the fiber reinforcement material, it is not necessary to apply resin to the portions of the outer plies 22 and 24 which form part of rigid members 12 and 14 since the resin in the prepreg plies is sufficient to fully wet-out the unprotected portions of the outer plies 22 and 24. On the other hand, if all plies are laid-up dry, all plies will be resin impregnated following lay up with the hinge portions of the outer plies 22 and 24 previously treated with protective material. It is important to note that the protective materials, such as 26 and 28, must always be applied to the plies prior to the application of the resin matrix material at the hinge portion of the plies.

A compressible, resilient, insert 30, preferably made of an elastomeric foam material and sized to be received snugly between the facing surfaces 27 and 29 of members 12 and 14 and inboard of protected outer plies 22 and 24 and serves the function of adding flexibility to composite hinge 16.

It is necessary to fully impregnate outer fiber layers 22 and 24 with the protective material shown at 26 and 28 at the hinge area 16 prior to lay up. This may be accomplished by impregnating with RTV silicone rubber and allowing the protecting material to cure at room temperature. In the alternative, strips of elastomeric thermoplastic tape may be laid on the reinforcement fibers in the desired location and impregnation thereof accomplished under heat and pressure.

To prevent delamination between the plies such as 18 and 22 of composite members 12 and 14 adjacent the composite hinge 16, stitches of high tensile strength thread, which may be made of fibers such as fiberglass, aramid or carbon, stitch the plies together as shown at 32 and 34 so as to prevent delamination of the plies and hence add stability to the flexible hinge 16. Stitches 32 and 34 preferably form a row which is parallel and adjacent to the facing surfaces 27 and 29 of members 12 and 14.

When all-composite article 10 is fully laid-up, and with protective impregnation at areas 26 and 28 applied, and including compressible insert 30 and stitches 32 and 34, the unit is cured. In the curing process, article 10 is preferably vacuum bagged and placed in an autoclave in the case of prepreg material, or in a mold where resin is injected in the case of a dry fiber lay up. A typical cure involves a temperature of 350° F. and 50 psi.

With the all-composite article 10 constructed as shown in FIGS. 1 and 2, following the curing process, rigid composite members 12 and 14 may be moved pivotably with respect to one another about composite hinge 16 to a degree determined by the flexibility of hinge 16.

For composite articles requiring a high degree of flexibility between the two composite members which are joined through the composite hinge, the article may be fabricated as shown in cross section in FIG. 3 in which all-composite article 36 includes rigid composite members 38 and 40 joined pivotally by flexible composite hinge 42. While the FIG. 3 construction is shown in cross-section, it is otherwise shaped as the FIGS. 1 and 2 articles. In the FIG. 3 preferred embodiment construction, not only outer plies 44 and 46 extend for substantially the full width and length of composite member 36 and form part of hinge 42, but also at least one additional ply 48 extends substantially for the full length and width of composite members 36, including 38 and 40 and hinge 42. It will be evident to those skilled in the art that the width of the plies may be varied as a function of the strength requirements and the producability requirements of the product under construction. As in the FIG. 1 and 2 construction, the plies such as 44, 46 and 48 which will form hinge 42 must be laid-up dry so that the protective material will be applied directly thereto, as described hereinafter. Similarly as in the FIG. 1 and 2 construction, the remainder of the plies can be laid-up prepreg or dry.

In the FIG. 3 construction, compressible, resilient, inserts 50 and 52 are sized to be snugly received between the facing surfaces 53 and 55 of members 38 and 40 and between plies 42 and 48 and 48 and 52, respectively. Again the compressible members 50 and 52 may be made of elastomers. In the FIG. 3 construction fiber stitching of the type described in connection with FIGS. 1 and 2 occurs not only at stations 54 and 56 at the joined ends of members 36 and 40 but also at several stations, such as 58, along joint 42. This fiber stitching not only prevents delamination of the laminates of members 38 and 40 but also provides lateral stability to the flexible joint 42. Impregnation of protective material 60 is applied to outer layer 44 and a similar impregnation of protective material 62 is applied to outer layer 46. Similar impregnation of protective material shown at 61 and 63 is applied to ply 48. The impregnated protective material 60-63 is applied while layers or plies 44, 46 and 48 are dry before the ply lay-up process. As in the FIG. 2 construction, for purposes of illustration, protective material 60-63 is shown as separate from the plies into which they are to be impregnated, however, it should be understood that the protective material at 60-63 is fully impregnated into the hinge area of the plies extending across the hinge area prior to the application of a resin matrix material and ply lay up. Similarly, as in the FIGS. 1 and 2 construction, the inner plies can be laid-up prepreg or dry for later impregnation. The impregnated protective material 60-63, cover the full dimension of plies 48, 44 and 46 at joint 42 to prevent the intrusion of the resin from the composite members 38 and 40 thereinto during the curing process. Again, as in the FIGS. 1 and 2 construction, the compressible inserts 50 and 52 add flexibility to joint 42, while the protective material at 60-63 covering plies 48, 46 and 44 at joint 42 prevent the adhesion of resin or other matrix material to layers 48, 46 and 44 during the curing process, since such adhesion would reduce the flexibility of joint 42. It will be evident in view of the greater width W42 of hinge 42 that, assuming the inserts 50 and 52 of the FIG. 3 construction are of the same material as insert 30 of the FIG. 1 and 2 construction, that hinge 42 will provide greater flexibility and hence pivotal motion between the hinged composite members 38 and 40.

Figure 4:
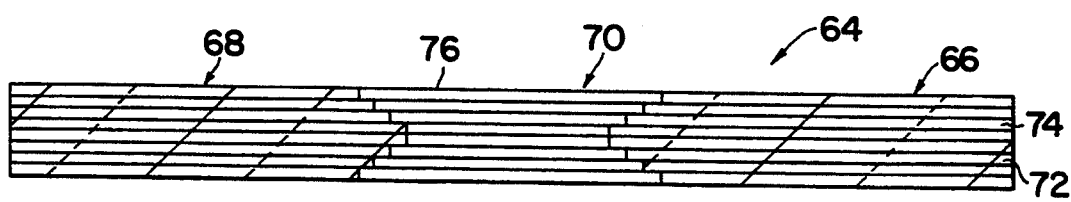
FIG. 4 corresponds to FIGS. 2 and 3 but is a cross sectional showing of a preferred embodiment of our all-composite article including two rigid members joined through a flexible hinge.
Figure 5:
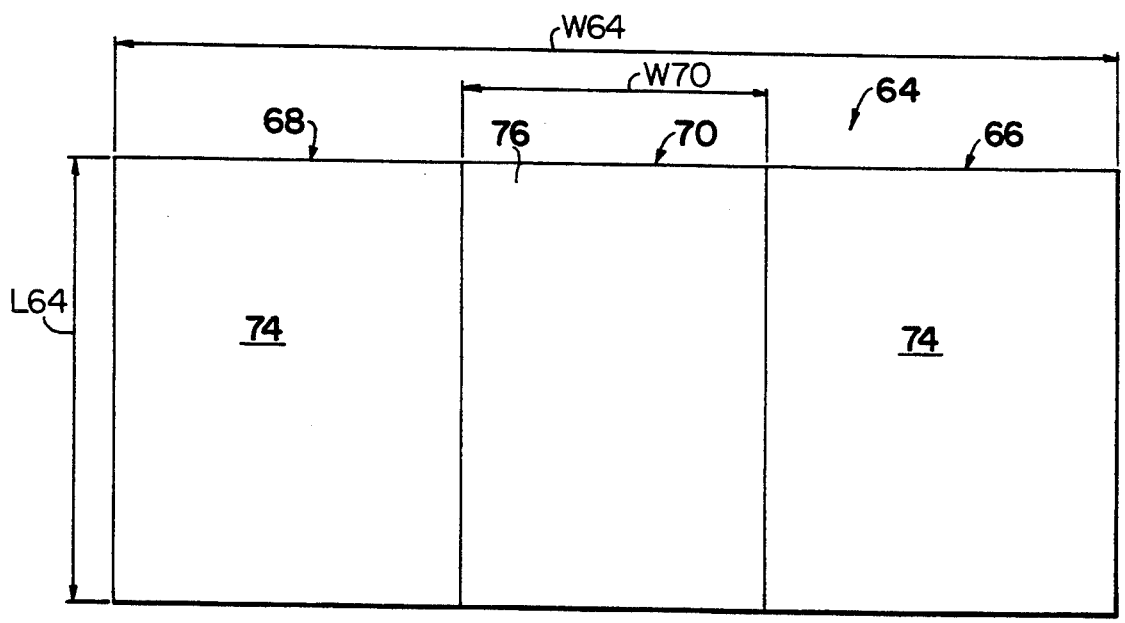
FIG. 5 is a top view of one of the plies used in laying up the construction shown in FIG. 4 to illustrate the application of the protective material thereto.

Our preferred embodiment is shown in FIGS. 4 and 5 in which all-composite member 64 comprises rigid composite members 66 and 68 joined through flexible hinge 70. The FIG. 4 all-composite article 64 comprises a plurality of laid-up plies, such as 72 and 74, which extend preferably for substantially the full length and width of member 64, that may vary depending upon product requirements. Each of the plies shown in the FIG. 4 construction therefore extends into and preferably across members 66 and 68 and across hinge 70 in this fashion. These plies, when cured, define the shape of article 64.

It is an important teaching of this invention that in fabricating the FIGS. 4 and 5 construction, that protective material, which can be unvulcanized rubber or thermoplastic elastomer, is laid as shown in FIG. 5 laterally across each ply such as 74. Protective material 76 is preferably in tape form or paste such that the distance that it extends along the width W70 of the FIG. 4 construction can be readily controlled.

In the FIG. 4 construction, all plies, such as 72 and 74 are preferably laid-up dry with tape 76 of protective material adhering thereto, and preferably in staggered formation as shown in FIG. 4 so as to enhance hinge flexibility and minimize stress concentrations. With the various plies so laid-up, the protective material 76 is cured, at room temperature in the case of RTU silicone, and under heat and pressure such as in a vacuum bag and within an autoclave for thermoplastic elastomers or high temperature vulcanizing rubbers. The temperature and pressure shall be such that the protective material of tape 76 fully impregnates and joins the plies in the full area of hinge 70. Due to this full impregnation, no increased thickness is caused in member 64 at hinge 70.

With protective material 76 so cured so as to fully impregnate all plies at joint 70, the entire composite part 64 is cured preferably using a resin transfer molding process as the method of impregnating resin into the laid-up plies, such as 72 and 74, prior to or during the curing process of member 64. During final curing, member 64 is placed in an appropriately shaped mold to define the desired final shape of article 64, and then cured under heat and pressure, preferably under pressure of 1-50 psi and at room temperature to 350° F. to perform the desired molding process. This curing process results in an all-composite article including rigid members 66 and 68 joined through hinge 70, which is integral therewith.

If the resin transfer molding process is used, unimpregnated continuous fiber plies, fiber mat, foam, pre-cured details and the like, are placed into a matched die mold. This assembly is subsequently injected with a matrix resin at elevated temperature. The part is then raised at a higher temperature and cured.

While the type of material used as the plies, the resin, and the protective material will vary depending upon the purpose to which the hinged composite article is to be put and the environment in which it is to be used, we have found that the following materials were quite suitable for our purpose. Our preferred plies are made of aramid fiber or fabric made by E. I. Dupont and sold as Kevlar ®, the protective material is preferably a thermoplastic elastomer made by Dow Chemical Co., and identified as Pellethane ® polyurethane elastomer, the resin matrix material is preferably an epoxy made by Dow Chemical Co., and identified as Tactic 123, and the compressible, resilient inserts are preferably made of silicone foam rubber, sold by General Electric Co.

When the composite hinged product being fabricated is of substantial size, it may be necessary to use more than one piece of a high tensile strength fiber material to form the various plies of the product. FIGS. 6 and 7 show embodiments in which more than one piece of high tensile strength fiber material is used to produce a ply or a series of plies of that material.

Viewing FIG. 6, we see the all-composite hinged product 80 consisting of rigid composite members 82, 84 joined through composite hinge 86. In this construction, the plies such as 88, 90 of hinge 86 overlap the plies, such as 92, 94 of composite member 82, and similarly overlap plies such as 96, 98 of composite member 84. It is important in the FIG. 6 construction that the overlap distance L between the hinge plies, such as 88, 90, and the composite member plies 92–98 is such that the shear load required to pull the hinge ply out from between the plies of the composite members is greater than the tensile strength of the ply. As in the previously described constructions, the ply portion of the hinge which will serve as the hinge is previously coated and fully impregnated with the protective elastomeric material prior to ply lay up and compressible inserts such as 100, are preferably placed between the hinge plies as in FIG. 2 and FIG. 3 constructions. In FIG. 6 construction, it will be evident that the overlapping of the hinge plies with the composite part plies will cause the finished product to be of greater thickness in the area of overlapping than in the area outboard thereof. The length of the hinge plies, such as 88, 90 may, however, be varied to effect an appropriate taper. In the FIG. 6 construction, the number of hinge plies and the distance that these plies extend and overlap the plies of the composite members will be a function of the strength requirements of the hinge design.

FIG. 7 illustrates a construction in which more than one piece of high tensile strength material is used to form each ply and which is of uniform composite thickness. In the FIG. 7 construction, composite member 102 is joined to composite member 104 through composite joint 106 to form hinged all composite product 107. It would be noted in the FIG. 7 construction that each ply, such as top ply 108 is formed by butt joining plies 110 and 112 of composite members 102 and 104 to hinge ply 114 of hinge 106. Gaps 116 and 118, respectively, exist between composite member plies 110 and 112 and hinge ply 114. Similar gaps occur as illustrated in FIG. 7 in the other plies. It is important in this construction that the gaps in adjacent plies should be spaced such as illustrated as $L_1$ between gaps 116 and 120, a sufficient distance so that the load-to-shear out of any single ply from the two adjacent plies is equal to or greater than the tensile breaking load for that ply.

In the multiple piece ply construction shown in FIGS. 6 and 7, the portion of the ply which defines the hinge area must extend into the members 12 and 14 a distance required by the part configuration and the strength requirements of the part being fabricated.

The all-composite hinge products produced utilizing the FIG. 6 and 7 construction are preferably made of the same materials and cured in the same fashion as the products produced by the earlier disclosed FIGS. 1–5 constructions so that the description of the curing process will not be repeated.

It will be evident that in the FIG. 7 construction, an all-composite member is formed of a uniform thickness by utilizing the staggered butt joint construction between the portions of the various plies.

We claim:

1. An article of manufacture comprising:
   a. A first rigid composite member comprising a plurality of plies of high tensile strength fibers layed-up one upon the other and bonded together by a first resin matrix,
   b. A second rigid composite member comprising a plurality of plies of high tensile strength fibers laid-up one upon the other and bonded together by a second resin matrix, and
   c. A hinge member joining said first and second members in hinge fashion and comprising,
      1. At least one hinge ply of high tensile strength fibers extending for at least a portion of the length and width of said first member and forming part thereof within said first resin matrix and further extending for at least a portion of the length and width of such second member and forming part thereof within said second resin matrix and still further including a hinge area extending between said first and second members, the width of the hinge area being determined by the spacing between said first and second members, and
      2. A protective material cooperating with the hinge area of said hinge ply to provide flexibility thereto and to prevent the resin from said first and second resin matrices of said first and second members from adhering to the hinge areas of the hinge ply during curing, so as to provide a flexible hinge between said first and second members.

2. An article of manufacture according to claim 1 and wherein the hinge ply is continuous and extends for substantially the full length and the full width of the first and second composite members.

3. An article of manufacture according to claim 2 wherein the hinge member comprises a plurality of said hinge plies of high tensile strength fibers forming part of said first and said second composite members.

4. An article of manufacture according to claims 1, 2, or 3 and wherein the protective material cooperating with the hinge ply is flexible and impregnates the hinge ply over the full area between the first and second composite members.

5. An article of manufacture according to claim 4 and wherein said protective material is chosen from among the group consisting of RTV silicone rubber, unvulcanized rubber, and thermoplastic elastomer.

6. An article of manufacture according to claim 5 and wherein said first and second composite members are spaced from one another and include respective facing surfaces and said hinge member further includes a resilient insert extending between the hinge plies and also extending between said facing surfaces of the first and second members to add flexibility to the hinge member.

7. An article of manufacture according to claim 6 and further including at least one row of stitches of high tensile strength fiber extending through each of said first and second composite members parallel and adjacent to said facing surfaces so as to prevent delamination of said first and second composite members.

8. An article of manufacture according to claim 7 and further including a plurality of rows of high tensile strength fiber stitches extending through said hinge member and extending laterally thereacross at several locations throughout the width thereof.

9. An article of manufacture according to claim 3 and wherein one of said hinge plies is the top most ply in said first and second members, and further wherein one of said hinge plies is the bottom most ply in said first and second members.

10. An article of manufacture according to claim 9 and wherein the hinge areas of the hinge plies are of maximum width at the top and bottom hinge ply and reduce progressively in width to be of minimum width at the inner most plies, thereby relieving stress concentrations at and increasing the flexibility of the hinge member.

11. An article of manufacture according to claim 1 wherein at least one of said plies of said first and second composite members are separate pieces from at least one of said plies of said hinge member and are joined thereto by an overlapping joint and in which the amount of overlapping between the plies of said first and second composite members and of said hinge member is selected so that the shear load required to pull said one hinge ply out of the plies of said first and second composite members to which it is joined by the overlapping joint is greater than the tensile strength of said one hinge ply.

12. An article of manufacture according to claim 1 wherein at least some of the plies of high tensile strength fibers in said first and said second composite members are separate from at least one of the plies in the hinge member, and are joined thereto during the curing process by butt joints.

13. An article of manufacture according to claim 12, wherein a layered plurality of the high tensile strength plies of the first and second composite members are separate from a layered plurality of the plies of high tensile strength fibers of the hinge member and are joined thereto by butt joints during the curing process and wherein the butt joints are staggered in adjacent ply layers with sufficient distance that the load required to pull a single ply from between two adjacent ply layers is equal to or greater than the tensile breaking load for that single ply.

14. An article of manufacture according to claim 1 wherein the resin of said first resin matrix and of said second resin matrix is the same.

* * * * *